US012620692B2

(12) United States Patent
Deng et al.

(10) Patent No.: US 12,620,692 B2
(45) Date of Patent: May 5, 2026

(54) WEARABLE DEVICE

(71) Applicant: Quanta Computer Inc., Taoyuan City (TW)

(72) Inventors: Ying-Cong Deng, Taoyuan City (TW); Chung-Ting Hung, Taoyuan City (TW); Chin-Lung Tsai, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 280 days.

(21) Appl. No.: 18/398,358

(22) Filed: Dec. 28, 2023

(65) Prior Publication Data

US 2025/0105496 A1 Mar. 27, 2025

(30) Foreign Application Priority Data

Sep. 23, 2023 (TW) .................................. 11221033

(51) Int. Cl.
*G04G 17/04* (2006.01)
*H01Q 1/27* (2006.01)
*H01Q 9/04* (2006.01)

(52) U.S. Cl.
CPC ............. *H01Q 1/273* (2013.01); *G04G 17/04* (2013.01); *H01Q 9/0421* (2013.01)

(58) Field of Classification Search
CPC ............................... G04G 17/04; H01Q 1/273
See application file for complete search history.

(56) References Cited

U.S. PATENT DOCUMENTS

| | | | | |
|---|---|---|---|---|
| 9,362,624 | B2 * | 6/2016 | Stoytchev | H01Q 1/38 |
| 2015/0102974 | A1 * | 4/2015 | Stoytchev | H01Q 5/371 343/843 |
| 2015/0288074 | A1 * | 10/2015 | Harper | H01Q 9/42 343/833 |
| 2016/0248146 | A1 * | 8/2016 | Wang | H01Q 7/00 |
| 2018/0175486 | A1 * | 6/2018 | Hsieh | H04N 5/64 |
| 2018/0366832 | A1 * | 12/2018 | Ying | H01Q 21/28 |
| 2021/0218400 | A1 * | 7/2021 | Chen | H01Q 21/30 |
| 2021/0376457 | A1 * | 12/2021 | Sone | H01Q 21/08 |

* cited by examiner

*Primary Examiner* — Sean Kayes
(74) *Attorney, Agent, or Firm* — McClure, Qualey & Rodack, LLP

(57) ABSTRACT

A wearable device includes a feeding radiation element, a connection radiation element, a bifurcate radiation element, a shorting radiation element, an extension radiation element, and a carrier element. The feeding radiation element has a feeding point. The connection radiation element is coupled to the feeding radiation element. The bifurcate radiation element is coupled to the connection radiation element. The connection radiation element is also coupled through the shorting radiation element to a grounding point. The extension radiation element is coupled to the feeding radiation element. The feeding radiation element, the connection radiation element, the bifurcate radiation element, the shorting radiation element, and the extension radiation element are disposed on the carrier element. An antenna structure is formed by the feeding radiation element, the connection radiation element, the bifurcate radiation element, the shorting radiation element, and the extension radiation element.

11 Claims, 4 Drawing Sheets

WEARABLE DEVICE

CROSS REFERENCE TO RELATED APPLICATIONS

This application claims priority of Taiwan Patent Application No. 112210333 filed on Sep. 23, 2023, the entirety of which is incorporated by reference herein.

BACKGROUND OF THE INVENTION

Field of the Invention

The disclosure relates in general to a wearable device, and in particular, to a wearable device and an antenna structure therein.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Researchers predict that the next generation of mobile devices will be "wearable devices". For example, wireless communication may be applied to watches, glasses, and even clothes in the future. However, watches, for example, do not have a large enough internal space to accommodate antennas for wireless communication. Therefore, this has become a critical challenge for antenna designers.

BRIEF SUMMARY OF THE INVENTION

In an exemplary embodiment, the invention is directed to a wearable device that includes a feeding radiation element, a connection radiation element, a bifurcate radiation element, a shorting radiation element, an extension radiation element, and a carrier element. The feeding radiation element has a feeding point. The connection radiation element is coupled to the feeding radiation element. The bifurcate radiation element is coupled to the connection radiation element. The connection radiation element is also coupled through the shorting radiation element to a grounding point. The extension radiation element is coupled to the feeding radiation element. The feeding radiation element, the connection radiation element, the bifurcate radiation element, the shorting radiation element, and the extension radiation element are all disposed on the carrier element. An antenna structure is formed by the feeding radiation element, the connection radiation element, the bifurcate radiation element, the shorting radiation element, and the extension radiation element.

In some embodiments, the wearable device is a smart watch, and the carrier element is a nonconductive watch frame.

In some embodiments, the connection radiation element, the bifurcate radiation element, and the shorting radiation element are disposed at the same side of the feeding radiation element. The extension radiation element is disposed at the opposite side of the feeding radiation element.

In some embodiments, the bifurcate radiation element includes a first branch portion, a second branch portion, a third branch portion, and a fourth branch portion.

In some embodiments, the shorting radiation element substantially has a meandering shape.

In some embodiments, the combination of the feeding radiation element and the extension radiation element substantially has an L-shape.

In some embodiments, the antenna structure covers a first frequency band and a second frequency band.

In some embodiments, the first frequency band is from 741 MHz to 782 MHz, and the second frequency band is from 1710 MHz to 2155 MHz.

In some embodiments, the total length of the feeding radiation element, the connection radiation element, and the bifurcate radiation element is substantially equal to 0.25 wavelength of the central frequency of the first frequency band.

In some embodiments, the total length of the feeding radiation element and the extension radiation element is substantially equal to 0.25 wavelength of the lowest frequency of the second frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
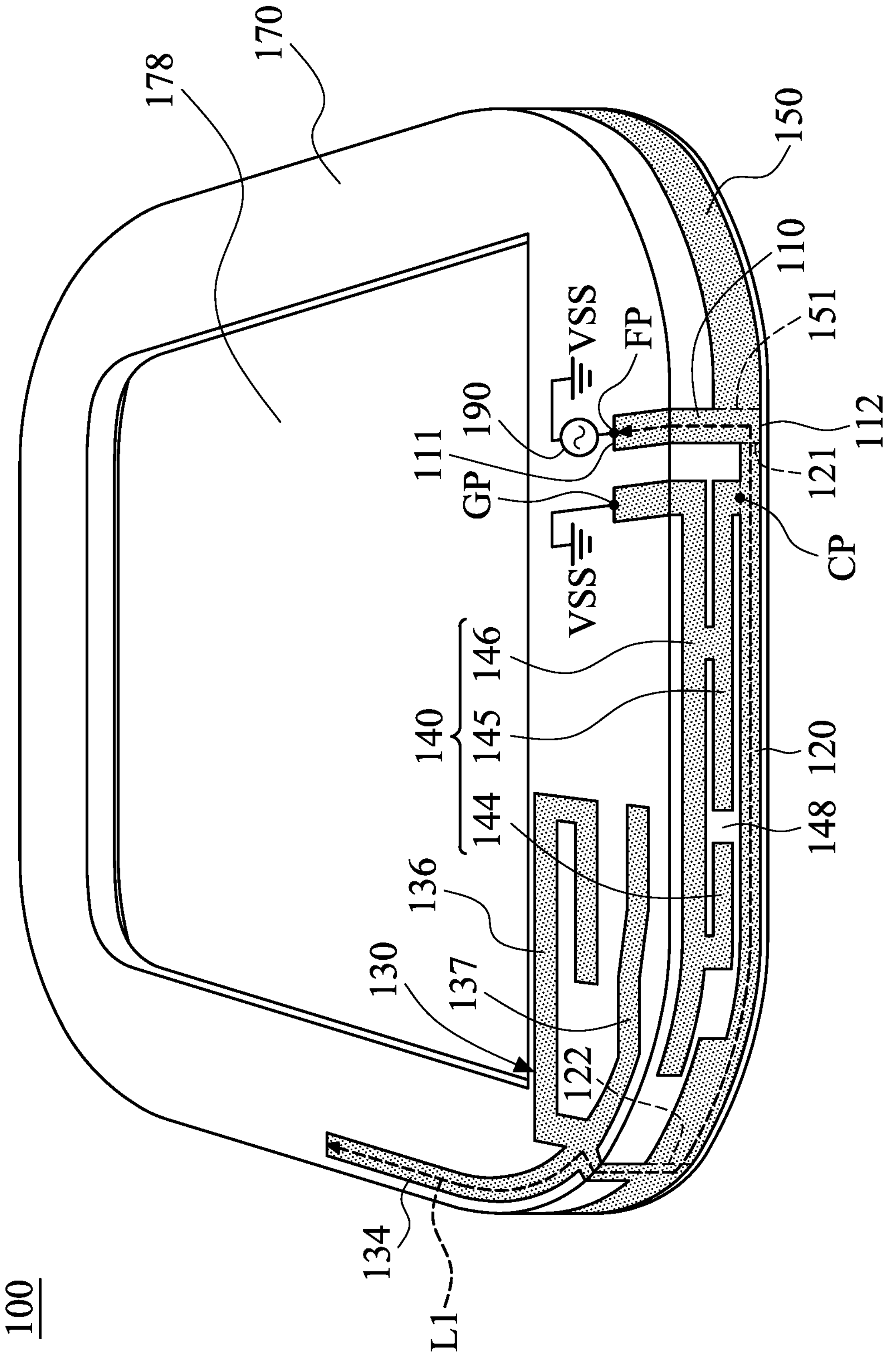
FIG. 1 is a front view of a wearable device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
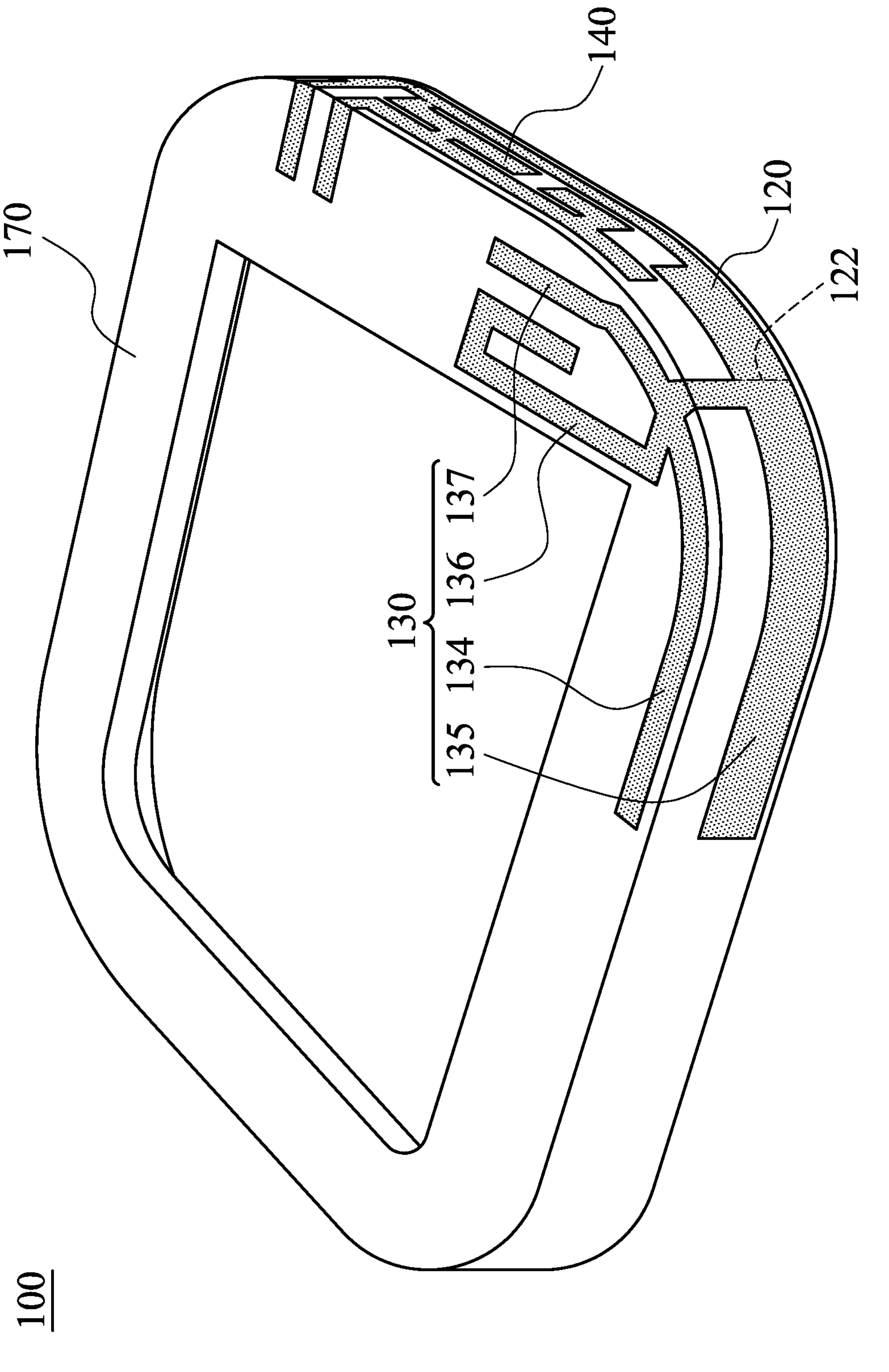
FIG. 2 is a left-side view of a wearable device according to an embodiment of the invention.
Figure 3:
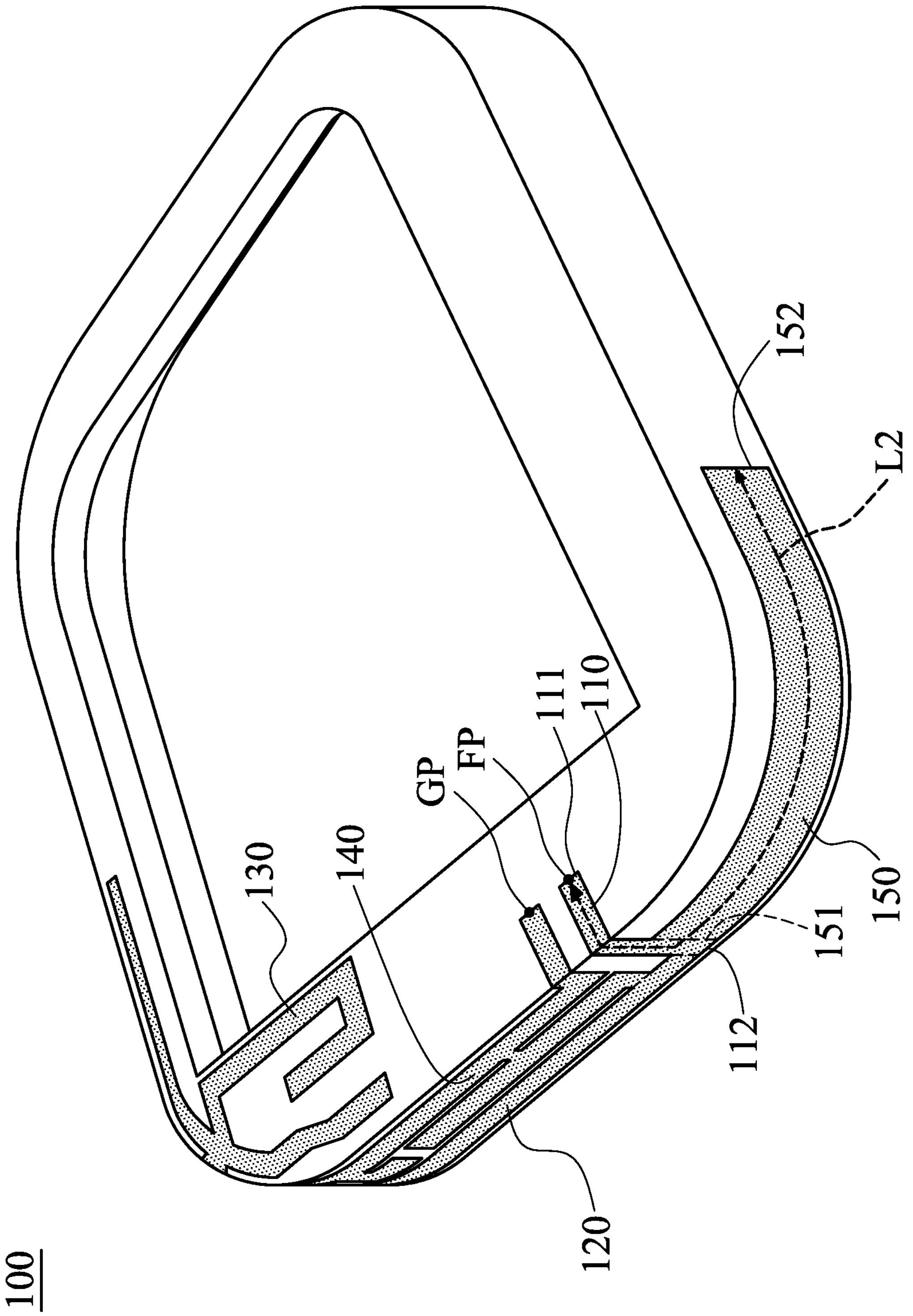
FIG. 3 is a right-side view of a wearable device according to an embodiment of the invention.

FIG. 1 is a front view of a wearable device 100 according to an embodiment of the invention. FIG. 2 is a left-side view of the wearable device 100 according to an embodiment of the invention. FIG. 3 is a right-side view of the wearable device 100 according to an embodiment of the invention. Please refer to FIG. 1, FIG. 2 and FIG. 3 together. In some embodiments, the wearable device 100 is a wrist-wearable device, such as a smart watch or a smart sporty bracelet.

In the embodiment of FIG. 1, FIG. 2 and FIG. 3, the wearable device 100 at least includes a feeding radiation element 110, a connection radiation element 120, a bifurcate radiation element 130, a shorting radiation element 140, an extension radiation element 150, and a carrier element 170. The feeding radiation element 110, the connection radiation element 120, the bifurcate radiation element 130, the shorting radiation element 140, and the extension radiation element 150 may all be made of metal materials, such as copper, silver, aluminum, iron, or their alloys. It should be understood that the wearable device 100 may further include other components, such as a battery, an hour hand, a minute hand, a second hand, a signal processing module, a counter, a processor, a thermometer, a barometer, a time adjuster, a connection belt, a waterproof housing, and/or a buckle, although these components are not displayed in FIG. 1, FIG. 2 and FIG. 3.

The feeding radiation element 110 may substantially have a straight-line shape. Specifically, the feeding radiation element 110 has a first end 111 and a second end 112. A feeding point FP is positioned at the first end 111 of the feeding radiation element 110. The feeding point FP may be further coupled to a signal source 190. For example, the signal source 190 may be an RF (Radio Frequency) module. In some embodiments, the connection radiation element 120, the bifurcate radiation element 130, and the shorting radiation element 140 are disposed at the same side (e.g., the left side) of the feeding radiation element 110, and the extension radiation element 150 is disposed at the opposite side (e.g., the right side) of the feeding radiation element 110.

The connection radiation element 120 may substantially have a variable-width straight-line shape, which may be substantially perpendicular to the feeding radiation element 110. Specifically, the connection radiation element 120 has a first end 121 and a second end 122. The first end 121 of the connection radiation element 120 is coupled to the second end 112 of the feeding radiation element 110. The second end 122 of the connection radiation element 120 is coupled to the bifurcate radiation element 130.

The bifurcate radiation element 130 is coupled through the connection radiation element 120 to the feeding radiation element 110. In some embodiments, the bifurcate radiation element 130 includes a first branch portion 134, a second branch portion 135, a third branch portion 136, and a fourth branch portion 137 which are coupled with each other. For example, each of the first branch portion 134, the second branch portion 135, and the fourth branch portion 137 of the bifurcate radiation element 130 may substantially have an arc-shape or a straight-line shape, and the third branch portion 136 of the bifurcate radiation element 130 may substantially have a J-shape, but they are not limited thereto.

The shorting radiation element 140 may substantially have a meandering shape. A connection point CP on the connection radiation element 120 is also coupled through the shorting radiation element 140 to a grounding point GP. The connection point CP may be adjacent to the first end 121 of the connection radiation element 120. The grounding point GP is further coupled to a ground voltage VSS. For example, the ground voltage VSS may be provided by a system ground plane (not shown) of the wearable device 100. In some embodiments, the shorting radiation element 140 includes a Z-shaped portion 144, a straight-line portion 145, and an L-shaped portion 146 which are coupled with each other, but they are not limited thereto. In addition, a T-shaped slot 148 can be formed and surrounded by the Z-shaped portion 144, the straight-line portion 145, and the L-shaped portion 146 of the shorting radiation element 140. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

The combination of the feeding radiation element 110 and the extension radiation element 150 may substantially have an L-shape. Specifically, the extension radiation element 150 has a first end 151 and a second end 152. The first end 151 of the extension radiation element 150 is coupled to the second end 112 of the feeding radiation element 110. The second end 152 of the extension radiation element 150 is an open end.

In some embodiments, if the wearable device 100 is a smart watch, the carrier element 170 may be a nonconductive watch frame. The shape and style of the carrier element 170 are not limited in the invention. For example, the carrier element 170 may have a central opening 178, and the central opening 178 may substantially have a square shape. In addition, the feeding radiation element 110, the connection radiation element 120, the bifurcate radiation element 130, the shorting radiation element 140, and the extension radiation element 150 are all disposed on the carrier element 170.

In a preferred embodiment, an antenna structure of the wearable device 100 is formed by the feeding radiation element 110, the connection radiation element 120, the bifurcate radiation element 130, the shorting radiation element 140, and the extension radiation element 150. It should be understood that although the antenna structure of the wearable device 100 is a 3D (Three-Dimensional) antenna structure, in other embodiments, the antenna structure of the wearable device 100 can be modified into a planar antenna structure without affecting its communication function.

Figure 4:
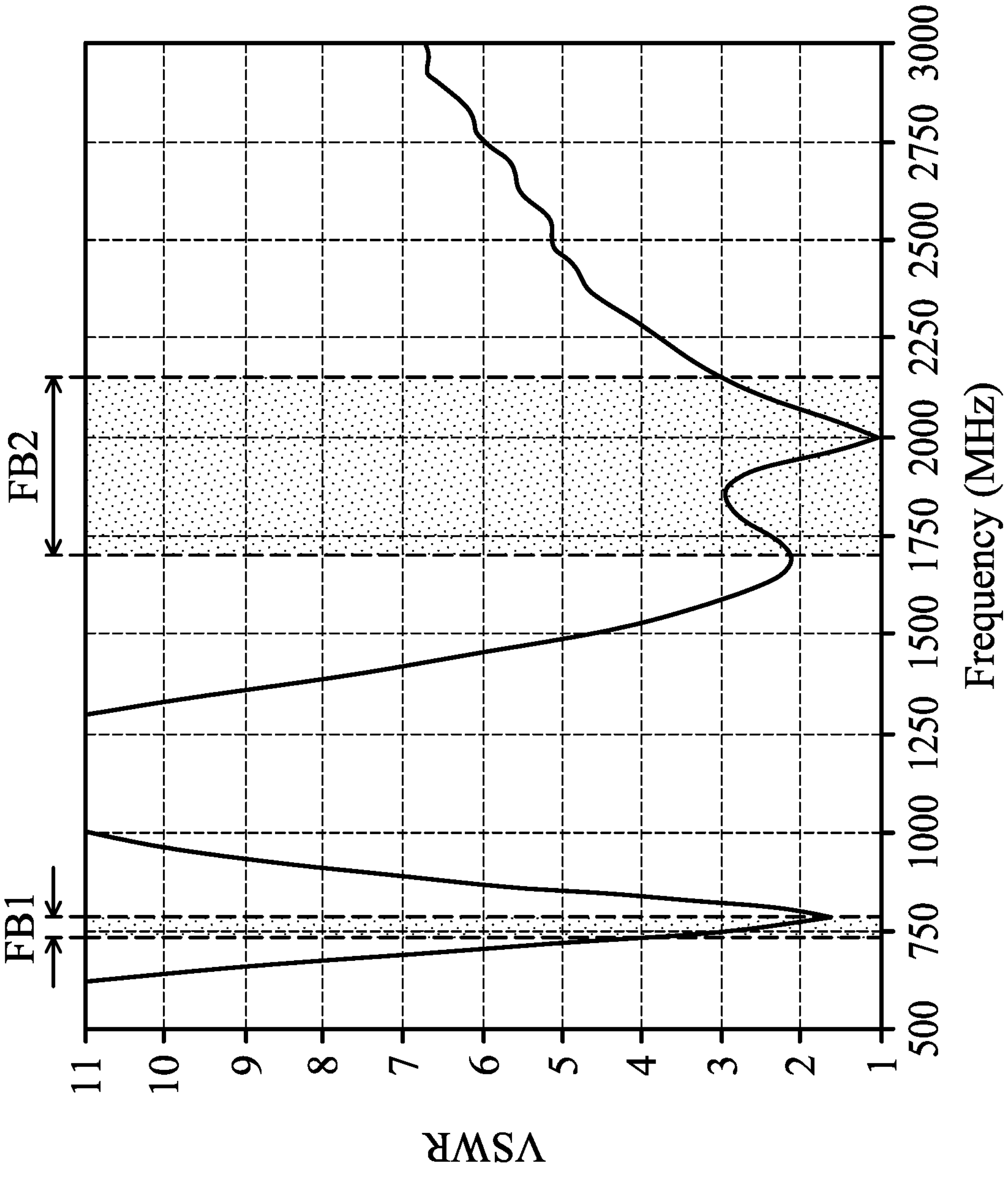
FIG. 4 is a diagram of VSWR (Voltage Standing Wave Ratio) of an antenna structure of a wearable device according to an embodiment of the invention.

FIG. 4 is a diagram of VSWR (Voltage Standing Wave Ratio) of the antenna structure of the wearable device 100 according to an embodiment of the invention. The horizontal axis represents the operational frequency (MHz), and the vertical axis represents the VSWR. According to the measurement of FIG. 4, the antenna structure of the wearable device 100 can at least cover a first frequency band FB1 and a second frequency band FB2. For example, the first frequency band FB1 may be from 741 MHz to 782 MHz, and the second frequency band FB2 may be from 1710 MHz to 2155 MHz. Therefore, the wearable device 100 can support at least the wideband operations of LTE (Long Term Evolution).

In some embodiments, the operational principles of the antenna structure of the wearable device 100 will be described as follows. The feeding radiation element 110, the connection radiation element 120, and the bifurcate radiation element 130 can be excited to generate the first frequency band FB1. The feeding radiation element 110, the shorting radiation element 140, and the extension radiation element 150 can be excited to generate the second frequency band FB2. Specifically, the extension radiation element 150 can correspond to a relatively low-frequency interval of the second frequency band FB2, and the shorting radiation element 140 can correspond to a relatively high-frequency interval of the second frequency band FB2. It should be noted that since the proposed antenna structure is well integrated with the carrier element 170, the overall size of the wearable device 100 of the invention can be further reduced.

In some embodiments, the element sizes of the wearable device 100 will be described as follows. The total length L1 of the feeding radiation element 110, the connection radiation element 120, and the bifurcate radiation element 130 (or its first branch portion 134) may be substantially equal to 0.25 wavelength (λ/4) of the central frequency of the first frequency band FB1 of the antenna structure of the wearable device 100. The total length L2 of the feeding radiation element 110 and the extension radiation element 150 may be substantially equal to 0.25 wavelength (λ/4) of the lowest frequency of the second frequency band FB2 of the antenna structure of the wearable device 100. The overall length of the wearable device 100 may be shorter than or equal to 42 mm. The overall width of the wearable device 100 may be shorter than or equal to 37 mm. The above ranges of element sizes are calculated and obtained according to many experiment results, and they help to optimize the operational bandwidth and the impedance matching of the antenna structure of the wearable device 100.

The invention proposes a novel wearable device. In comparison to the conventional design, the invention has at least the advantages of small size, wide bandwidth, and low manufacturing cost. Therefore, the invention is suitable for application in a variety of small-size devices with communication functions.

Note that the above element sizes, element shapes, and frequency ranges are not limitations of the invention. An antenna designer can fine-tune these settings or values according to different requirements. It should be understood that the wearable device of the invention is not limited to the configurations of FIGS. 1-4. The invention may merely include any one or more features of any one or more embodiments of FIGS. 1-4. In other words, not all of the features displayed in the figures should be implemented in the wearable device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wearable device, comprising:

a feeding radiation element, having a feeding point;

a connection radiation element, coupled to the feeding radiation element;

a bifurcate radiation element, coupled to the connection radiation element;

a shorting radiation element, wherein the connection radiation element is coupled through the shorting radiation element to a grounding point;

an extension radiation element, coupled to the feeding radiation element; and a carrier element, wherein the feeding radiation element, the connection radiation element, the bifurcate radiation element, the shorting radiation element, and the extension radiation element are disposed on the carrier element;

wherein an antenna structure is formed by the feeding radiation element, the connection radiation element, the bifurcate radiation element, the shorting radiation element, and the extension radiation element;

wherein the bifurcate radiation element comprises a first branch portion, a second branch portion, a third branch portion, and a fourth branch portion;

wherein each of the first branch portion and the second branch portion substantially has an arc-shape;

wherein the second branch portion extends along the first branch portion.

2. The wearable device as claimed in claim 1, wherein the wearable device is a smart watch, and the carrier element is a nonconductive watch frame.

3. The wearable device as claimed in claim 1, wherein the connection radiation element, the bifurcate radiation element, and the shorting radiation element are disposed at a same side of the feeding radiation element, and the extension radiation element is disposed at an opposite side of the feeding radiation element.

4. The wearable device as claimed in claim 1, wherein the shorting radiation element substantially has a meandering shape.

5. The wearable device as claimed in claim 1, wherein a combination of the feeding radiation element and the extension radiation element substantially has an L-shape.

6. The wearable device as claimed in claim 1, wherein the antenna structure covers a first frequency band and a second frequency band.

7. The wearable device as claimed in claim 6, wherein the first frequency band is from 741 MHz to 782 MHz, and the second frequency band is from 1710 MHz to 2155 MHz.

8. The wearable device as claimed in claim 6, wherein a total length of the feeding radiation element, the connection radiation element, and the bifurcate radiation element is substantially equal to 0.25 wavelength of a central frequency of the first frequency band.

9. The wearable device as claimed in claim 6, wherein a total length of the feeding radiation element and the extension radiation element is substantially equal to 0.25 wavelength of the lowest frequency of the second frequency band.

10. The wearable device as claimed in claim 1, wherein the third branch portion substantially has a J-shape.

11. The wearable device as claimed in claim 1, wherein the third branch portion is at least partially surrounded by the first branch portion and the fourth branch portion.

* * * * *